US010305826B1

(12) United States Patent
White et al.

(10) Patent No.: US 10,305,826 B1
(45) Date of Patent: *May 28, 2019

(54) INTELLIGENT CONVERSATIONAL SYSTEMS

(71) Applicant: Progressive Casualty Insurance Company, Mayfield Village, OH (US)

(72) Inventors: Matthew T. White, Mayfield Village, OH (US); Brian J. Surtz, Mayfield Village, OH (US); Callen C. Cox, Mayfrield Village, OH (US)

(73) Assignee: Progressive Casualty Insurance Company, Mayfield Village, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/970,632

(22) Filed: May 3, 2018

(51) Int. Cl.
| *G06Q 40/08* | (2012.01) |
| *G06N 5/02* | (2006.01) |
| *H04L 12/58* | (2006.01) |
| *G10L 13/04* | (2013.01) |
| *G06F 17/28* | (2006.01) |
| *G10L 15/26* | (2006.01) |

(52) U.S. Cl.
CPC .......... *H04L 51/02* (2013.01); *G06F 17/2881* (2013.01); *G06N 5/022* (2013.01); *G06Q 40/08* (2013.01); *G10L 13/043* (2013.01); *G10L 15/265* (2013.01)

(58) Field of Classification Search
CPC .. G06Q 40/08; G06Q 10/06316; G06Q 40/00; G06N 99/005; G06N 5/02
See application file for complete search history.

(56) References Cited

U.S. PATENT DOCUMENTS

| 7,124,088 | B2* | 10/2006 | Bauer | G06Q 10/10 705/4 |
| 8,346,563 | B1* | 1/2013 | Hjelm | G10L 15/1822 379/88.01 |
| 8,433,588 | B2* | 4/2013 | Willis | G06Q 40/08 705/2 |
| 8,924,410 | B2* | 12/2014 | Bierner | G06F 17/3064 707/768 |
| 9,183,593 | B2* | 11/2015 | Willis | G06Q 40/08 |
| 9,305,548 | B2* | 4/2016 | Kennewick | G10L 15/1822 |
| 9,652,805 | B1* | 5/2017 | Clawson, II | G06Q 40/08 |
| 9,916,625 | B2* | 3/2018 | Lehman | G06Q 40/08 |
| 2004/0111330 | A1* | 6/2004 | Stanton | G06Q 30/02 705/4 |
| 2006/0143093 | A1* | 6/2006 | Brandt | G06F 3/0482 705/26.1 |

(Continued)

*Primary Examiner* — Paulinho E Smith
(74) *Attorney, Agent, or Firm* — Benesch, Friedlander, Coplan & Aronoff LLP

(57) ABSTRACT

A system and method simulates conversation with a human user. The system and method receive media, convert the media into a system-specific format, and compare the converted media to a vocabulary. The system and method generate a plurality of intents and a plurality of sub-entities and transform them into a pre-defined format. The system and method route intents and the sub-entities to a first selected knowledge engine and a second knowledge engine. The first selected knowledge engine selects the second knowledge engine and each active grammar in the vocabulary uniquely identifies each of the knowledge engines.

33 Claims, 10 Drawing Sheets

(56) References Cited

U.S. PATENT DOCUMENTS

| | | | | |
|---|---|---|---|---|
| 2008/0065426 | A1* | 3/2008 | Ziade | G06Q 40/08 705/4 |
| 2010/0023320 | A1* | 1/2010 | Di Cristo | G06F 17/273 704/9 |
| 2010/0100398 | A1* | 4/2010 | Auker | G06Q 10/087 705/4 |
| 2011/0289015 | A1* | 11/2011 | Mei | G06Q 10/04 705/347 |
| 2012/0221357 | A1* | 8/2012 | Krause | G06Q 40/08 705/4 |
| 2012/0262296 | A1* | 10/2012 | Bezar | G10L 17/26 340/573.1 |
| 2013/0204645 | A1* | 8/2013 | Lehman | G06Q 40/08 705/4 |
| 2013/0226892 | A1* | 8/2013 | Ehsani | G06F 17/30864 707/706 |
| 2014/0046891 | A1* | 2/2014 | Banas | G06N 5/022 706/46 |
| 2014/0129261 | A1* | 5/2014 | Bothwell | G06Q 40/08 705/4 |
| 2014/0214414 | A1* | 7/2014 | Poliak | G10L 21/0208 704/228 |
| 2014/0244317 | A1* | 8/2014 | Roberts | G06Q 40/08 705/4 |
| 2014/0250116 | A1* | 9/2014 | Hsu | G06F 17/30864 707/728 |
| 2014/0330594 | A1* | 11/2014 | Roberts | G06Q 10/06316 705/4 |
| 2015/0142447 | A1* | 5/2015 | Kennewick | G10L 15/1822 704/275 |
| 2016/0048936 | A1* | 2/2016 | Perkowski | G06Q 50/184 705/310 |
| 2016/0078544 | A1* | 3/2016 | Brady | G06Q 40/08 705/4 |
| 2017/0032466 | A1* | 2/2017 | Feldman | G06Q 40/08 |
| 2017/0270921 | A1* | 9/2017 | Arslan | G06F 17/279 |
| 2017/0272396 | A1* | 9/2017 | Chhaya | H04L 51/32 |
| 2017/0323319 | A1* | 11/2017 | Rattner | G06Q 30/0206 |

* cited by examiner

INTELLIGENT CONVERSATIONAL SYSTEMS

BACKGROUND OF THE DISCLOSURE

1. Technical Field

This disclosure relates to enabling computers to execute tasks, and specifically to enabling computers to execute tasks that normally require human intelligence.

2. Related Art

Today, computers execute specific tasks. Computers support word processing, execute searches, and carry out repetitive calculations. Computers enforce security, control processes, and solve deterministic mathematical equations. Many computers do not simulate aspects of human intelligence such as logical deductions, inferences, cognitive tasks, or generate creative replies in response to incomplete information. The computer systems do not recognize or react to human languages or learn from experiences. The systems do not communicate in a form that is similar to or indistinguishable from human speech.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like referenced numerals designate corresponding parts throughout the different views.

DETAILED DESCRIPTION

An intelligent conversational system and process (referred to as an interactive agent) converse in an easy and familiar manner. It may converse lightly and casually using an end user's style and vocabulary, in a fashion and a tone that is similar to, or indistinguishable from, that of human speech. The interactive agent moves beyond traditional desktop and mobile processing but is accessible through an application program interface within a celestial architecture. The celestial architecture decouples backend computing from front-end processing. By using modules and delegations, the interactive agents conduct dialogues from a textual, auditory, vision-based input and/or augmented reality input. The proprietary and open source modules include multiple parts: an interface that determines which constants, data types, variables, and routines that are accessed by other modules, routines and itself; and, private code that is accessible only to the module, which includes the source code that implements the routines in the modules. The modules perform various stages of recognition and implement specific actions.

A delegation assigns access rights from one module to the next. By passing access rights from one module to another, work is distributed such as between several modules, without affecting system security or the integrity of a resource and enabling flexible work distributions and scalability. In the disclosed celestial architecture, some modules are on different machines, operating systems, and/or within different processing domains. A nonreducible textual element of data, a unique structured data object, or a unique token that may be circulated (referred to as a data object or a proxy) can be used to make a delegation from one module to another. A proxy allows a module receiving the data object or proxy to operate with the same or restricted rights and privileges that are subject to the module providing the grant. A module may create a proxy with the same or fewer rights and privileges than it possesses.

Figure 1:
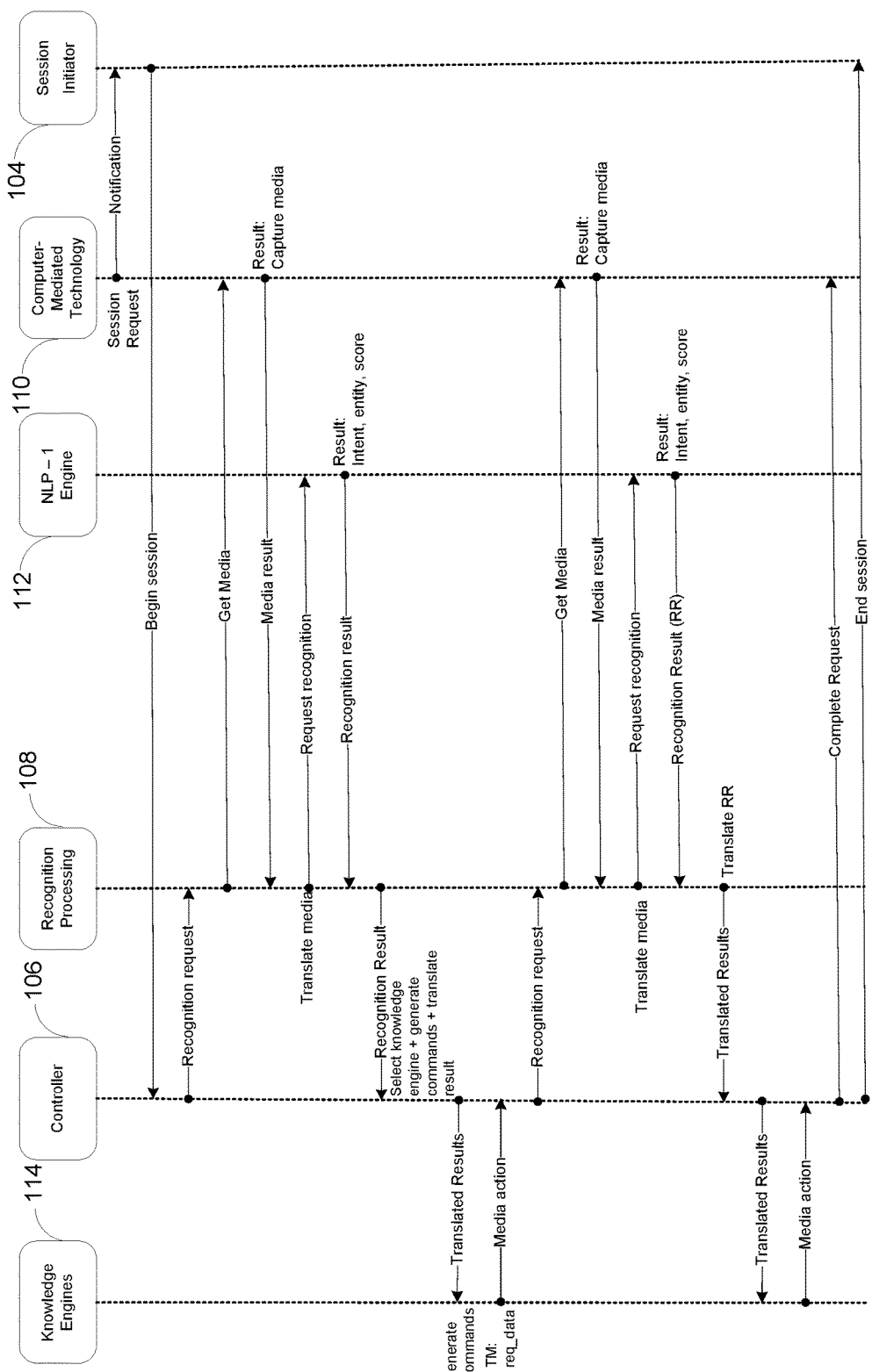
FIG. 1 is a flow diagram of a program that conducts conversations and/or executes task from one or more input sources.

In FIG. 1, a controller 106 interfaces knowledge engines 114 and a recognition processor 108. The recognition processor 108 interfaces a natural language processing engine 112 and social media 110. Social media 110 generally refers to computer-mediated technology that enables users to create and share content or participate in social networking via virtual communities and networks. Computer-mediated technology enables human communication that occurs through two or more electronic devices. The devices may provide input from various sources including, but not limited to, audio, text, images, video, augmented reality, etc. Some social media 110 interfaces users through mobile apps, which are computer programs designed to run on mobile devices, such as phones, watches, or tablets.

In FIG. 1 the knowledge engines 114 are the subject matter experts, separate from, but in communication with controller 106. There are one or multiple knowledge engines (that may be designated as N knowledge engines). The knowledge engines 114 interpret and act upon an intent and its sub-entities. An intent generally refers to the interpreted aim or purpose of a computer-mediated communication input. In an insurance context, an intent may ask for an insurance quote or service for an insurance claim or service for an existing insurance policy. Its associated sub-entities provide context to data often in a hierarchical order. A higher-level sub-entity may identify one or more insurance products, such as automobile insurance, motorcycle insurance, condominium insurance, recreational vehicle insurance, renter insurance, etc. and a lower-level sub-entity may provide the information needed to complete an interaction associated with an intent, such as the desired coverage limits for an insurance quote.

Figure 3:
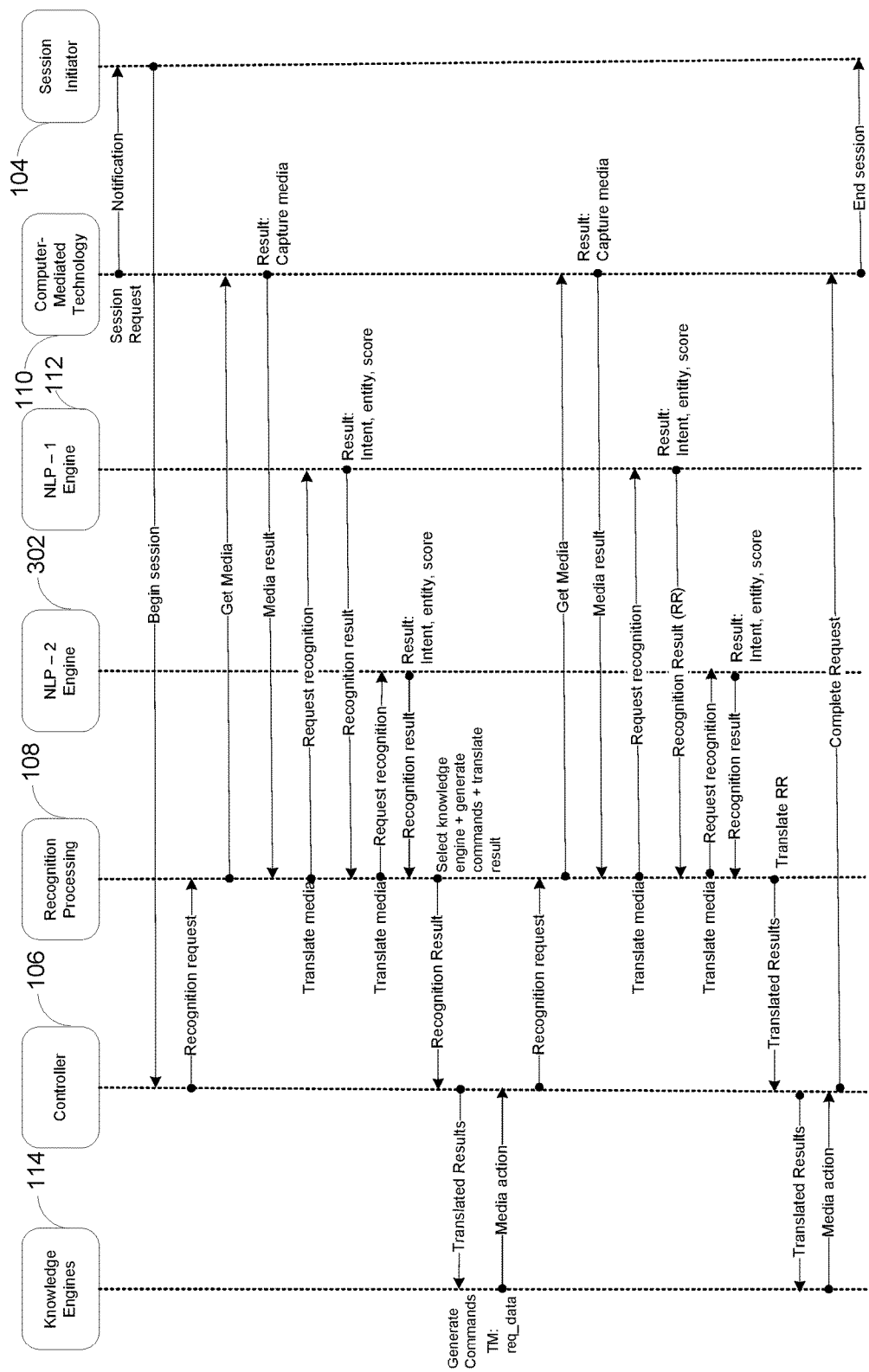
FIG. 3 a third flow diagram of a program that conducts dialogues and/or executes task from one or more input sources.

In FIG. 1, a natural language processing engine 112 uses grammars to identify one or more intents from a conveyance. A grammar may be stored in a file that contains a list of words and phrases to be recognized, and in some instances, include programming logic to aid a module. All active grammars make up a vocabulary. The natural language processing engine 112 takes the translated media, compares it to a vocabulary, and matches the translated media to the vocabulary's words and/or phrases. The natural language processing engine 112 extracts or generates sub-entities from the conveyance and adds them as payload data to the intents to form the data structure that the controller 106 and/or knowledge engine 114 process. The payloads include confidence scores that indicate the likelihood of a successful recognition. One natural language processing engine 112 as shown in FIG. 1, two natural language processing engines 112 and 302 as shown in FIG. 3, or three or more natural language engines (N natural language engines) may be used in alternate interactive agents.

Each knowledge engine (individually and collectively identified by reference number 114) handles a specific type of recognized result. A knowledge engine may serve an insurance quoting system, another knowledge engine may serve a claims processing system, and another knowledge engine may serve on-line insurance servicing of existing insurance policies, for example.

In this disclosure, any module in the systems and methods described may manage dialogue, share dialogue management, or delegate dialogue management with other modules making the interactive agents scalable and secure. If a dialogue management is hosted in a module that becomes infected by an intrusive program, such as a virus or malware that has damaging effects, a distributed dialogue management or delegated management allows the interactive agent to maintain the state and flow of a conversation by transferring dialogue management to an uninfected module before the infected module is isolated. The input and output controls and strategic management controls of the dialogue management can be shared and executed by multiple modules and passed to a single module.

Dialogue is managed through an exchange manager. The exchange manager may standalone, may be integrated with, or may be a unitary part of one or more knowledge engines 114, controllers 106, and/or recognition processors 108 and/or distributed between the modules through delegations. Some exchange managers process one or more representations of the dialogue and maintain state variables, such as a dialogue history making the interactive agent stateful. Stateful means the interactive agents monitor all or substantially all of the details of a dialogue in which it participates and accounts for the source, destination, and content of a message, for example. A dialogue history may track the details of a dialogue, such as tracking the topics or subjects of the discussion. By analyzing dialogue history and identifying features a user makes use of the most, the interactive agents engage users, avoid repetition, facilitate conversations, build on previous dialogues, and are more likely to service the user's request. A dialogue manager may also track question-answer pairs (e.g., selecting a best answer for a question if there are several answers, or the second best answer, if the first answer was already used, or the third best answer if the second best answer was already used . . . etc.) or the last answered question.

Some exchange managers execute other functions too. Other functions include executing rules, whether machine learned or pre-programmed, to select the best term to use in a dialogue, and/or determine what action the exchange manager should take at each point in the dialogue exchange. To make a response more natural, some exchange managers execute output control. When some exchange managers determine that the interactive agent is communicating with a millennial by detecting one or more phrases millennials frequently use, by semantic comparisons for example, the exchange managers select and respond with a generational-type expression such as "you are slaying it" or uses another phrase millennials commonly use. If the exchange managers determine that the interactive agents are communicating with a baby-boomer, for example, the exchange managers may use a more formal generational-type of response such as "you are doing a great job" or respond with another phrase baby-boomers would use. A biometric module enables this age-based functionality through comparisons of semantic-recognitions to machine-learned or pre-programmed generational defining terms or phrases. The biometric module enables the exchange manager to identify a user's generation when a confidence level of the recognition result exceeds a threshold. The identification identifies or points to a file or vocabulary containing a list of words and phrases associated with that generation that are selectable by a knowledge engine 114 or the controller 106. Selection allows the interactive agent to provide an age appropriate response or modify a response that is published on social media 110.

Besides recognizing unique generational conversational patterns, some exchange managers recognize cultural or social characteristics and/or attitudes via their classifications of active grammars and comparisons to recognition results to personalize and customize the output of the interactive agents. Unlike language recognition that is concerned with recognizing content, cultural and social recognition is concerned with recognizing the unique background behind the user and responding like someone with his or her background. This biometric module compares semantic-recognitions to machine-learned or predesignated defining terms or phrases strongly linked to unique backgrounds, enabling the interactive agent to identify the user's background when a confidence level of the recognition result exceeds a predetermined fixed or dynamic threshold. Once cultural or social characteristics are identified, the interactive agent responds by selecting a vocabulary or output file of words and phrases that are selectable by the knowledge engines 114, controller 106, and/or recognition processing 108 to render an output. The vocabulary is linked to the user's background and, in some interactive agents, the user's generation.

The personalization and customization of the output of the interactive agents may also model one, two, or more personalities. For example, "Flo", the upbeat fictional store employee that sells insurance for Progressive may respond with her very own Flo-isms when a model of her traits is part of the interactive agent. Flo-isms make Flo's personality distinctive and unique. If for example, Flo receives a complaint about someone running late, Flo may respond in a lively manner that makes an emotional connection with the user. A Flo-ism to such a complaint may be "Happens to me all the time." If a user complains about the tedious, menial, and unpleasant work of an annual office meeting, Flo may invite the user to continue their conversation by responding with: "Hey, it's an office party!". The list of words and phrases and programming logic that model Flo's traits may be stored in a unique vocabulary or unique file that is selectable by the knowledge engines 114, the controller 106, and the recognition processing 108 in response to a recognition result. The knowledge engines 114, the controller 106, and the recognition processing 108 modules may adapt their output via the unique vocabulary or unique file that models the autonomous fictional virtual human that sells insurance.

In other use cases, two or more personalities engage the user in one or more different dialogues. In an insurance context, for example, another unique vocabulary or file may model Mayhem's traits, the fictional character pitching insurance for Allstate Insurance. Mayhem's traits may be modeled via a vocabulary or file the includes a list of words and phrases and programming logic that distinguish his personality from others. Other use cases may make use of a unique vocabulary or file of surreal humor and satirical terms and phrases and programming logic that model an anthropomorphic day gecko like The Gecko pitching insurance for GEICO.

In FIG. 1, a session begins with a request from a session initiator 104. A session initiator 104 may initiate sessions, confirm terminations, and in some instances, maintain sessions. The session initiator 104 responds to a session request from one or more social media 104 by notifying controller 106. The session notification triggers a request for a recognition cycle, which causes the recognition processor 108 to capture the media from the computer-mediated social technology 110. The recognition processor 108 passes through or converts the captured media into a system-specific format that is processed by a natural language processor engine 112. The natural language processing engine results are returned to controller 106. The results include representations of the captured media (i.e., interpretations), process commands, intents, and related sub-entities generated from and/or extracted from the media, confidence scores of the intents, etc. The controller 106 determines which knowledge engines receive the results based on the intents and related sub-entities and confidence scores, which are passed through or are translated into the system-specific formats of the selected knowledge engines 114. In some instances, the selected knowledge engine 114 responds with a request for more information as shown in FIG. 1. The request may include commands to execute one, two, or more recognition cycles (one more recognition cycle is shown), which results in capturing textual or auditory input from social media applications, 110 such as Facebook and Facebook Messenger, for example.

The recognition processor 108 captures the response to the textual or auditory message. The recognition processor 108 converts the captured media into a system-specific semantic format that is processed by the natural language processor engine 112. The results are passed through or translated into the system-specific formats and transmitted to the selected knowledge engine 114. The knowledge engine 114 completes the action or transaction, and communicates via controller 106 to social media 110 before the session ends.

In FIG. 1, the exchange manager is shared with one or more knowledge engines 114. In other embodiments, it is shared through proxies that are passed with the objects to the modules process. The exchange manager processes representations of the dialogue and maintains state variables. Besides tracking the details of the dialogue and its question-answer pairs, the exchange manager executes the functionality described herein, including selecting the best term to use in a dialogue to make the interactive agent response more natural to the user, which may include responses that are similar to responses of the user's generation and/or background and/or one or more personalities.

Figure 2:
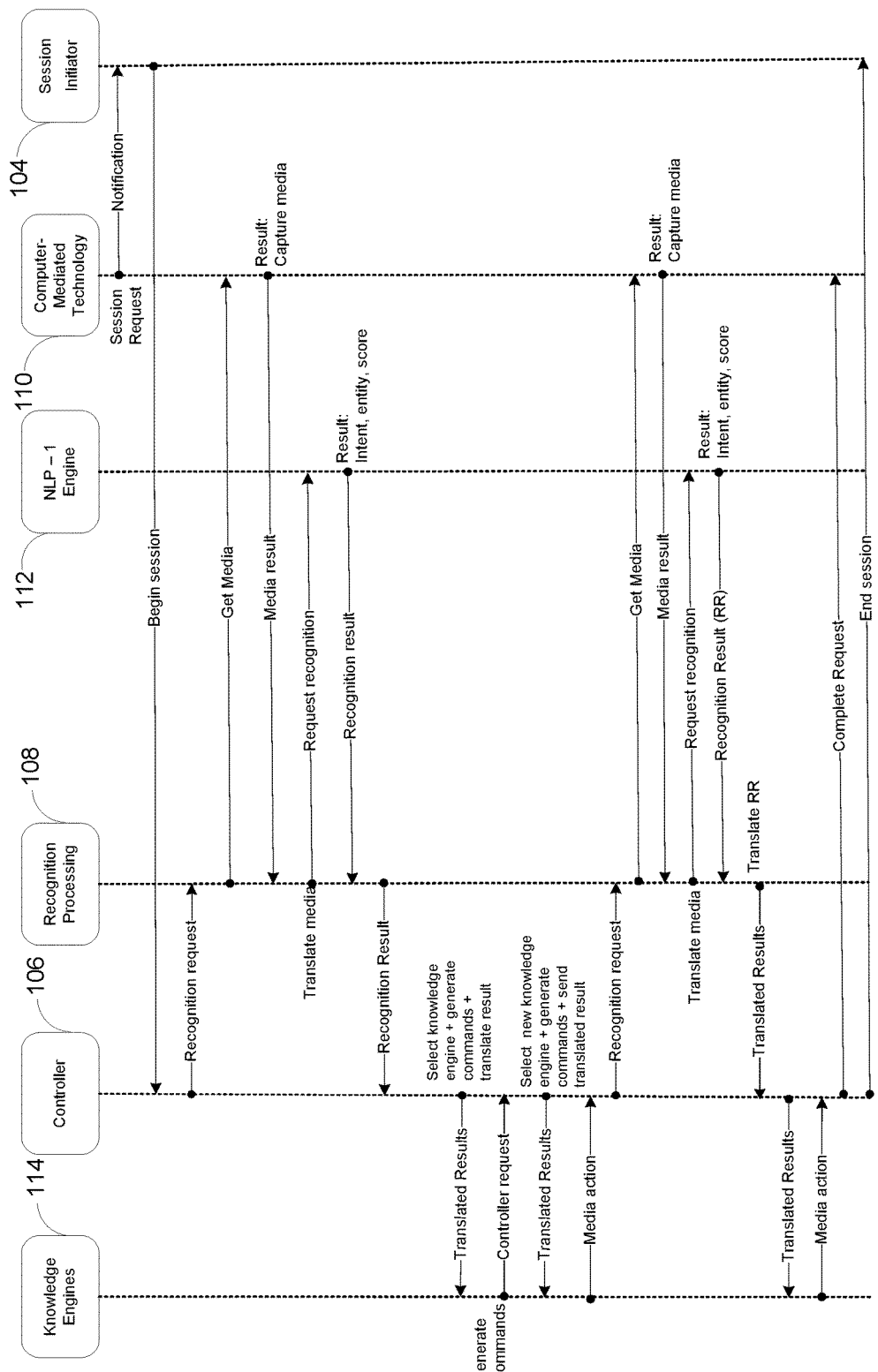
FIG. 2 a second flow diagram of a program that conducts dialogues and/or executes task from one or more input sources.

In FIG. 2, controller 106 executes exchange management. Controller 106 selects a second knowledge engine 114 in response to a request from the first selected knowledge engine 114. A session begins with a request from the session initiator 104. The recognition processor 108 captures the media from the computer-mediated social technology 110 and passes through or converts the captured media into a system-specific format processed by the natural language processor engine 112. The natural language processing engine results include representations of the captured media (i.e., interpretations), process commands, intents and related sub-entities extracted from the media, confidence scores of the intents and/or sub-entity combinations, etc. The results are returned to controller 106, which passes the results or translates them into the system-specific formats and formats required by the selected knowledge engine 114. Knowledge engine 114 selections are based on intents and associated confidence scores or combinations of intents and sub-entities and their associated confidence scores. When confidence scores exceed a predesignated threshold, controller 106 routes the results to the knowledge engine assigned to that recognized result.

Based on a knowledge base associated with the selected knowledge engine 114, the selected knowledge engine 114 in communication with controller 106 may automatically request that the process commands and result be shared with one or more additional knowledge engines 114. A knowledge base is a form of a database that may include rules and accumulated information related to the particular domain associated with one or more specific knowledge engines 114 (e.g., insurance quoting, or insurance claims servicing, or insurance policy servicing, etc.) and one or more downloadable profiles. The downloadable profiles identify granular attributes of behavior-based exchanges that indicate the knowledge engine 114 potentially better suited to complete an interaction. By including a knowledge base in this decision, a knowledge engine's automatic selections are not limited to comparisons of designated intent and sub-entity combinations and confidence scores exclusively. This behavior-based selection constitutes an improvement over traditional text matching and threshold comparisons as this interactive agent interprets a user's intentions in contexts (via recognizing holistic behavior-based or context-sensitive exchanges by considering statements that surround a word or passage), rather than being based exclusively on isolated input. The inclusion of sub-textual analysis enables a more flexible, nuanced, and accurate dialogue that can easily be tailored to the interactive agent's policies or customized to its user types. Further, access to a knowledge base improves the accuracy of knowledge engine 114 selections. As a result, fewer interactions with the user are needed to adequately respond to a user's request, which enhances computer efficiency and improves computer battery life. These benefits improve user experiences.

Consider an exchange with a new insurance user (e.g., not a customer of the insurance carrier) that uses the term "comprehensive" in multiple exchanges. In this use case, the interactive agent automatically concludes that the user has demonstrated an unfamiliarity with insurance based on the user's inability to answer common insurance questions. In viewing the context, the recentness of a predetermined number of unanswered or misunderstood questions, the confirmation that the user is not a customer of the insurance carrier (e.g., confirmed via the system's credential verification), and the use of the term "comprehensive", the knowledge base associates these contexts as a request for an all-inclusive quote for insurance. The knowledge engine 114 accessing the knowledge base, and/or in communication with the controller 106 determines that the user is likely asking for a home, an auto, a health, and a life insurance quote, that may be known as a bundled quote.

If a system processes the term "comprehensive" alone on its face, and specifically with respect to automobiles, the term "comprehensive" would be understood to refers to one of three basic insurance coverages. The two other coverages are liability and collision. Collision covers damage to vehicles following a collision—and comprehensive fills in the gaps by covering damage to vehicles caused by anything other than a collision (e.g., storm damage, fire, vandalism, animals, etc.,). While a recognition of the input alone would determine that the recognition result should be routed to knowledge engine supporting only insurance policy servicing and possibly vehicles specifically; based on the identified contexts and context associations stored in the knowledge base, the selected knowledge engine 114 (in some cases with controller 106) automatically requests that the process commands and result be shared with one or more knowledge engines servicing insurance quoting. This automated decision may also be based on comparisons of the results the first selected knowledge engine rendered processing the input, and the profile of behaviors. The profile of behaviors is referred to as downloadable because they are generated separately and apart from the knowledge base in this embodiment. In alternate embodiments, the knowledge base is local to the knowledge engine 114 and/or controller 106 and is updated whether machine learned or updated via programing. The profile of behaviors may associate behaviors with rules and/or data that achieves one or more knowledge engine 114 selections that based on the user's input and context of the exchange.

In FIG. 2, the selected knowledge engine's request triggers the selection of a second knowledge engine by controller 106. The controller 106 may convert the natural language processing engine results to a second form, format, and/or protocol if different from the first translation, or pass it through. If the second selected knowledge engine 114 responds with a request for more information as shown in FIG. 2, one or more recognition cycle occurs (one more additional recognition cycle is shown). The second recognition cycle captures the requested textual or auditory information from the computer-mediated social technology 110.

The recognition processor 108 converts the captured media into a system-specific format that is then processed by the natural language processor engine 112. The results are passed through or translated into the one or more forms, formats, and/or protocols of the first and/or second knowledge engines. The results are then transmitted to the selected first and/or second knowledge engines 114. The knowledge engines 114 complete the action or transaction; it confirms the completed the action or transaction: and the controller 106 terminates the session.

In FIG. 3, two recognition cycles are executed using two separate and remote natural language processing engines 112 and 302. The celestial based architecture interfaces local and remote natural language processing engines including cloud-based natural language recognizers and/or local natural language recognizers. Some local natural language recognizers apply fewer grammars, and in some applications, the local natural language recognizers are always listening for requests for a recognition. In alternate embodiments, more than two natural language processors are used and some of the natural language processors serve different forms of recognition results. Some natural language processing engines may provide intent-entity combinations and associated confidence score results in some interactions. Other natural language processing engines may provide complete responses that may be published directly on social media 110 immediately without further processing. The other natural language processing engines may serve canned responses, such as responses to frequently asked questions, for example.

Social media 110 triggers the first recognition cycle by sending a request to the session initiator 104, which requests a session and a recognition cycle from controller 106. The recognition processor 108 captures media from the computer-mediated social technology 110 and converts it into a system-specific format processed by a natural language processing engine 112. The natural language processing engine results include representations of the captured media (i.e., interpretations), process commands, intents and related sub-entities based on or extracted from the media, confidence scores of the intents or intent sub-entity combinations, etc. When results are returned, recognition processor 108 determines if additional recognition is needed via a second recognizer, such as the second natural language processing engine 302 shown in FIG. 3. The second natural language processing engine 302 comprises a common natural language processing engine but uses different active grammars (e.g., the words and phrases recognized by the language processing engine). In an alternate embodiment, the second natural language processing engine 302 comprises a separate natural language processing platform (e.g., a different natural language processing engine and vocabulary). Some natural language processing engines are cloud-based and remote from one another; others are local and part of a natural language processing platform. Each alternate embodiment provides one or more specific advantage or particular purpose to solve a problem rather than serving as a design choice. Among the advantages and purposes are the benefits of reduced memory resources when interactive agents use common natural language processing engines and more processing power when interactive agents use multiple natural processing engines and vocabularies. Another advantage includes access to larger vocabularies and remote accessibility when interactive agents use cloud-based natural language processing platforms and uninterrupted access when the natural language processing occurs locally. There is very little or no network dependence or bandwidth restrictions when processing occurs locally. In some embodiments, both local and cloud-based systems provide the benefits and advantages described above and overcome the deficiencies described above.

When additional recognition is needed via a second recognizer, such as shown in FIG. 3, the recognition processor 108 passes through or converts the captured media into the system-specific format that is processed by the second natural language engine 302. The recognition results generally include representations of the captured media (i.e., interpretations), process commands, intents and related sub-entities based on or extracted from the media, confidence scores of the intents and/or intents and sub-entity combinations, etc. The natural language processing engines 112 and 302 results are returned to controller 114, which passes them through or translates them into the system-specific formats of a selected knowledge engine 114. One or more knowledge engines may be selected based on a combination of intents and sub-entities and associated confidence scores. A translation may transform the results into a predefined form, format, and/or protocol for the selected knowledge engine 114 and generates process commands that are passed to the selected knowledge engines 114. In some dialogues, a knowledge engine 114 responds with a request for more information as shown in FIG. 3. The request may include commands to execute one or more recognition cycles (one more is shown) by one or both of the natural language processing engines 112 and 302. The request results in capturing additional textual or auditory input.

In this recognition cycle, the recognition processor 108 captures the next textual or auditory input. The recognition processor 108 passes through or converts the captured media into a system-specific semantic format that is processed by one or both of the natural language processor engines 112 and/or 302. The natural language results are passed through or translated into the system-specific formats, which are transmitted as translated results to the selected knowledge engines 114. The knowledge engine 114 thereafter completes an action or transaction or executes another recognition cycle before it confirms the completed request via social media 110. Once confirmed, the controller 106 terminates the session.

Figure 4:
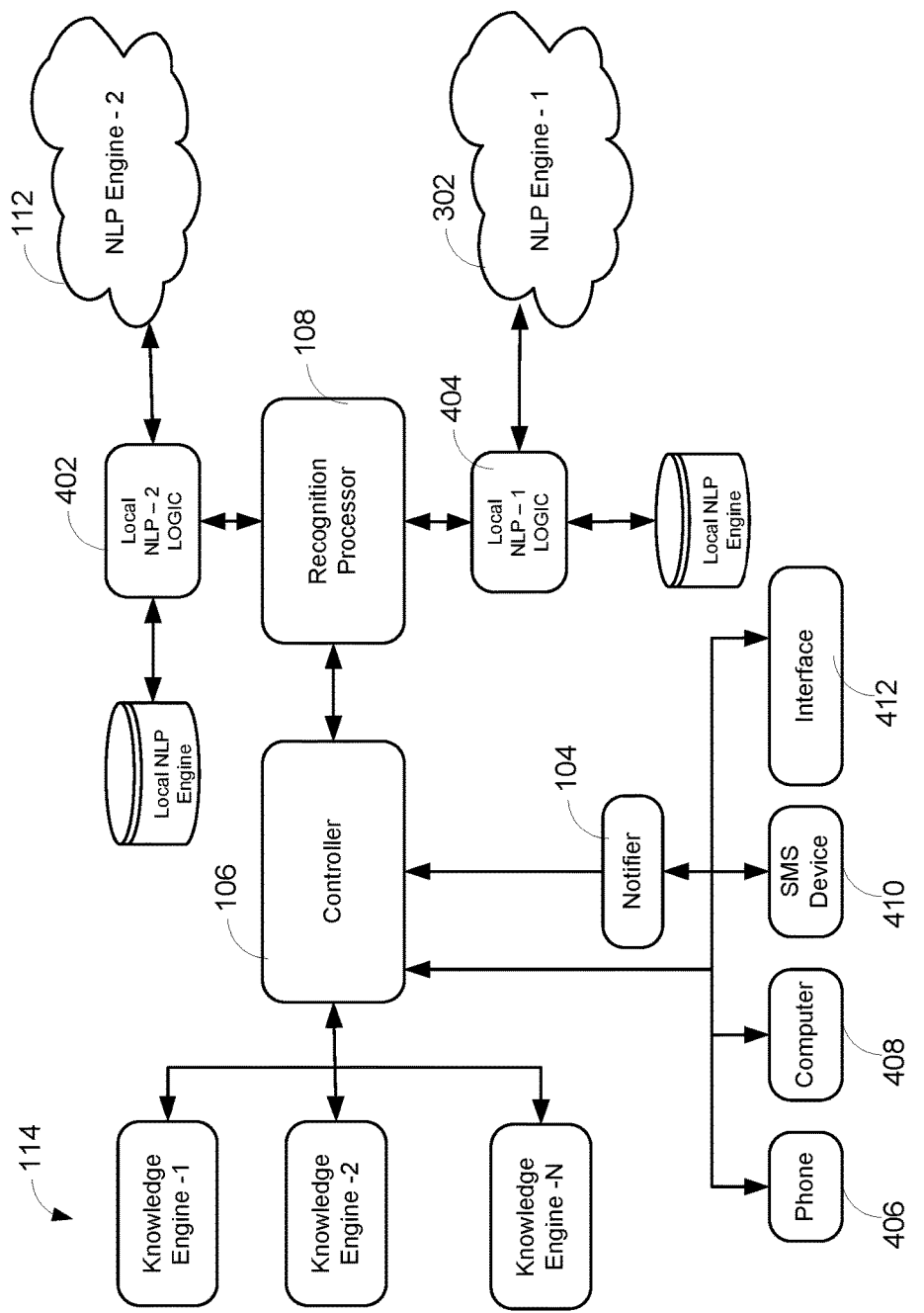
FIG. 4 is a block diagram of an intelligent conversational system.

FIG. 4 is a block diagram of the interactive agent that may execute the process flows described above and those shown in FIGS. 1-3 automatically. In FIG. 4, the recognition processor 108 interfaces two natural language processing engines 112 and 302 through abstraction level logic 402 and 404. The natural language processing engines 112 and 302 may be local and/or cloud-based (e.g., remote). A natural language platform collects social media input, passes the dialogue to one or both of the natural language processing engines 112 and 302 or more—1 through N if used in alternate embodiments (not shown)—and passes the recognition results to controller 106. The recognition results are assigned a confidence score or rating that reflect the likelihood of an accurate recognition by the one or more natural language processing engines 112 and 302. The natural language processing engines 112 and 302 are separate from the knowledge engines 114 (1 though N shown) that process the recognition results. Each of the knowledge engines 114 process specific types of recognized results. In some insurance based systems, one knowledge engine handles insurance quoting, a second knowledge engine handles claims processing, a third knowledge engine handles insurance servicing of existing insurance policies, a fourth knowledge engine handles usage-based insurance, and/or a fifth knowledge engine handles another function.

In FIG. 4, the interactive agent includes a session indicator 104 that initiates sessions and confirms terminations. A session refers to the time during which an interactive agent processes a dialogue. In FIG. 4, the session indicator 104 and controller 106 interfaces phones 406, computers 408, short-message-service devices 410, and other interfaces 412 that provide interactions with other devices such as vehicles and/or smart homes. In FIGS. 4, 5, 9, and 10, interface 412 is a point of interaction or a communication between the interactive agent and any other entity, such as computer or human operator. The interface, for example, may comprise a human machine interface (HMI) where interactions between the interactive agent and a human operator occurs. If an interactive agent requires assistance beyond its knowledge engines 114, the interactive agent may seamlessly hand off the exchange to the human operator to complete a task or continue the conversation. The interface may be used to modify the knowledge engines 114, modify or supplement vocabularies, and/or modify module code to train the interactive agents.

Besides the programming that allows the interactive agents to detect cues that make it possible to understand a dialogue, the interface 114 may serve as a point of interaction to process training data. The training data may reflect a range of conditions that include telemetry data that cover some or all of the subject matter domains and various operating states described. Further, when speech processing is used, the training data may include speech in relatively quiet and noisy settings as well as speech recorded in highly stressful conditions. The data may be processed concurrently or off-line to improve system performance.

Figure 5:
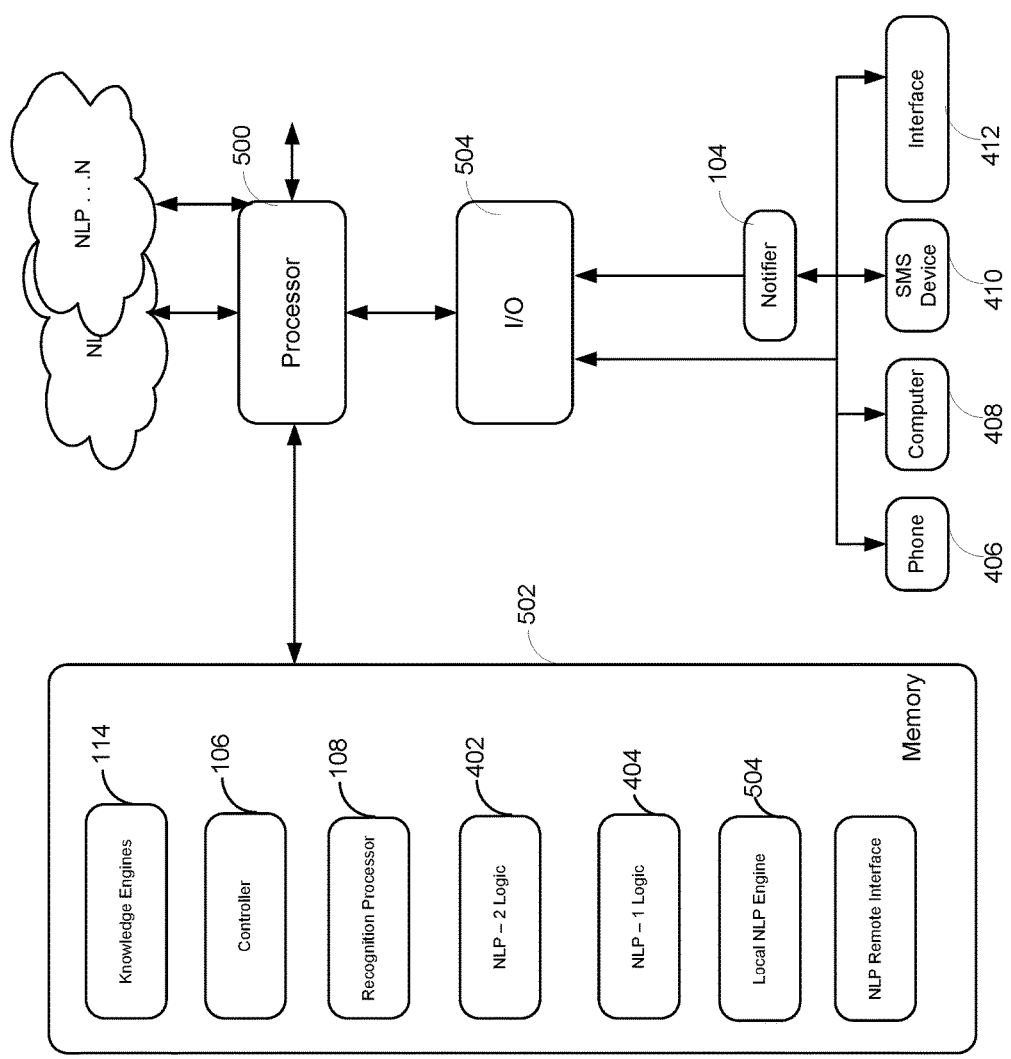
FIG. 5 is an alternate block diagram of an intelligent conversational system.

FIG. 5 is a block diagram of an alternate interactive agent that may execute the process flows described above and those shown in FIGS. 1-3 automatically. The system comprises a processor 500, a non-transitory media such as a memory 502 (the contents of which are accessible by the processor 500), a session initiator 104, and an I/O interface 504. The I/O interface 504 connects devices and local and/or remote applications such as, for example, additional local and/or remote recognition modules and local and/or remote knowledge engines. The memory 502 store instructions which when executed by the processor 500 causes the interactive agent to render some or all of the functionality associated with interpreting dialogue and executing an appropriate action. The memory 502 stores instructions, which when executed by the processor 500, causes the interactive agent to render the functionality associated with the knowledge engines 114, controller 106, recognition processor 108, abstraction level logic 402 and 404, the local natural language processing engine 504, and/or the software that interface the remote natural language processing engine shown as a cloud.

Figure 6:
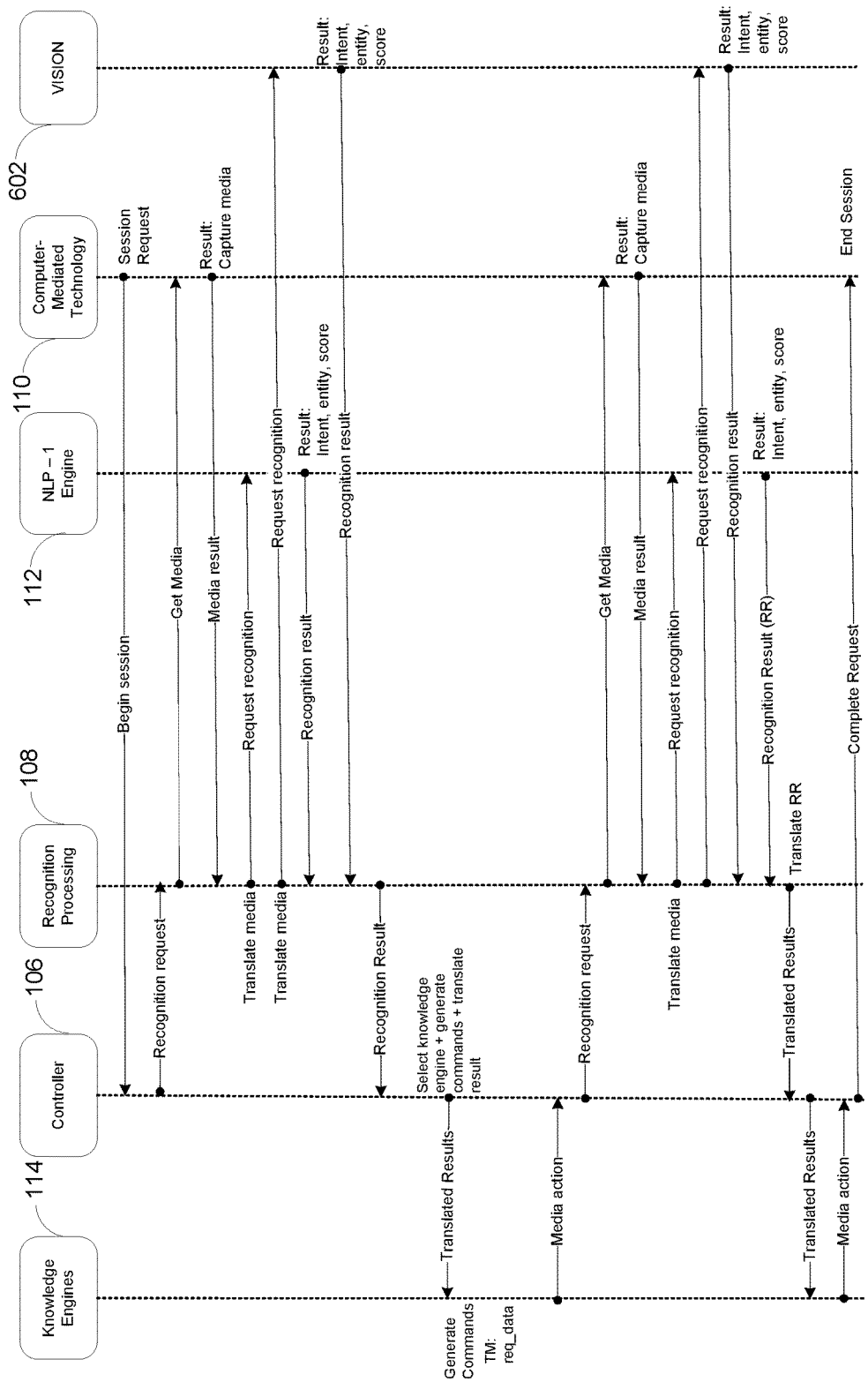
FIG. 6 is a flow diagram of a program that conducts dialogues and/or executes tasks from one or more input sources.

In FIG. 6, natural language processing and computer vision is used to process text, locate physical objects, and identify physical objects. Computer vison may stand alone, may be integrated with, or may be a unitary part of any one or more modules described herein. The physical objects may be identified from image or a video sequence. In FIG. 6, a session begins with a request from the session initiator 104. The session initiator 104 responds to the session request from one or more social media 104 by notifying controller 106. The session notification triggers a request for a recognition cycle, which causes the recognition processor 108 to capture the media from the computer-mediated social technology 110. The recognition processor 108 converts the captured media into a system-specific format that is processed by the natural language processor engine 112 and/or computer vision engine 602. The natural language processing and computer vision engine results are returned to controller 106. The natural-language results include representations of the captured media (i.e., interpretations), process commands, intents and related sub-entities generated from and/or extracted from the media, confidence scores of the intents, etc. The computer vision results may include physical object identification information, physical object position and orientation information, numerical measurement data, counts and classification of physical objects, images of the physical object, and confidence values related to the physical object identification.

Controller 106 determines which knowledge engines receive the results based on the intents and related sub-entities and confidence scores and/or one or more computer vision results, which are passed through or are translated into the system-specific formats of the selected knowledge engines 114. In some instances, the selected knowledge engine 114 responds with a request for more information as in FIG. 6. The request may include commands to execute one or more recognition and/or image capture cycles (one more recognition and capture cycle is shown), which results in capturing textual, auditory, and/or images or video from social media 110.

The recognition processor 108 captures the textual, auditory, and/or images or video. The recognition processor 108 passes through or converts the captured results into a system-specific format that is processed by the natural language processor engine 112 and/or computer vision engine 602. The recognition results are passed through or translated into the system-specific formats and transmitted to the selected knowledge engines 114. The knowledge engines 114 completes the action or transaction, communicates with social media 110 via controller 106, before the controller 106 terminates the session.

In FIG. 6, the exchange manager is shared with of one or more knowledge engines 114. In some embodiments, it is shared through proxies. The exchange manager processes representations of the dialogue and maintains state variables. Besides tracking the details of the dialogue and its question-answer pairs, the exchange manager executes the functionality that selects the best term to use in the dialogue to make the interactive agent response more natural.

Figure 7:
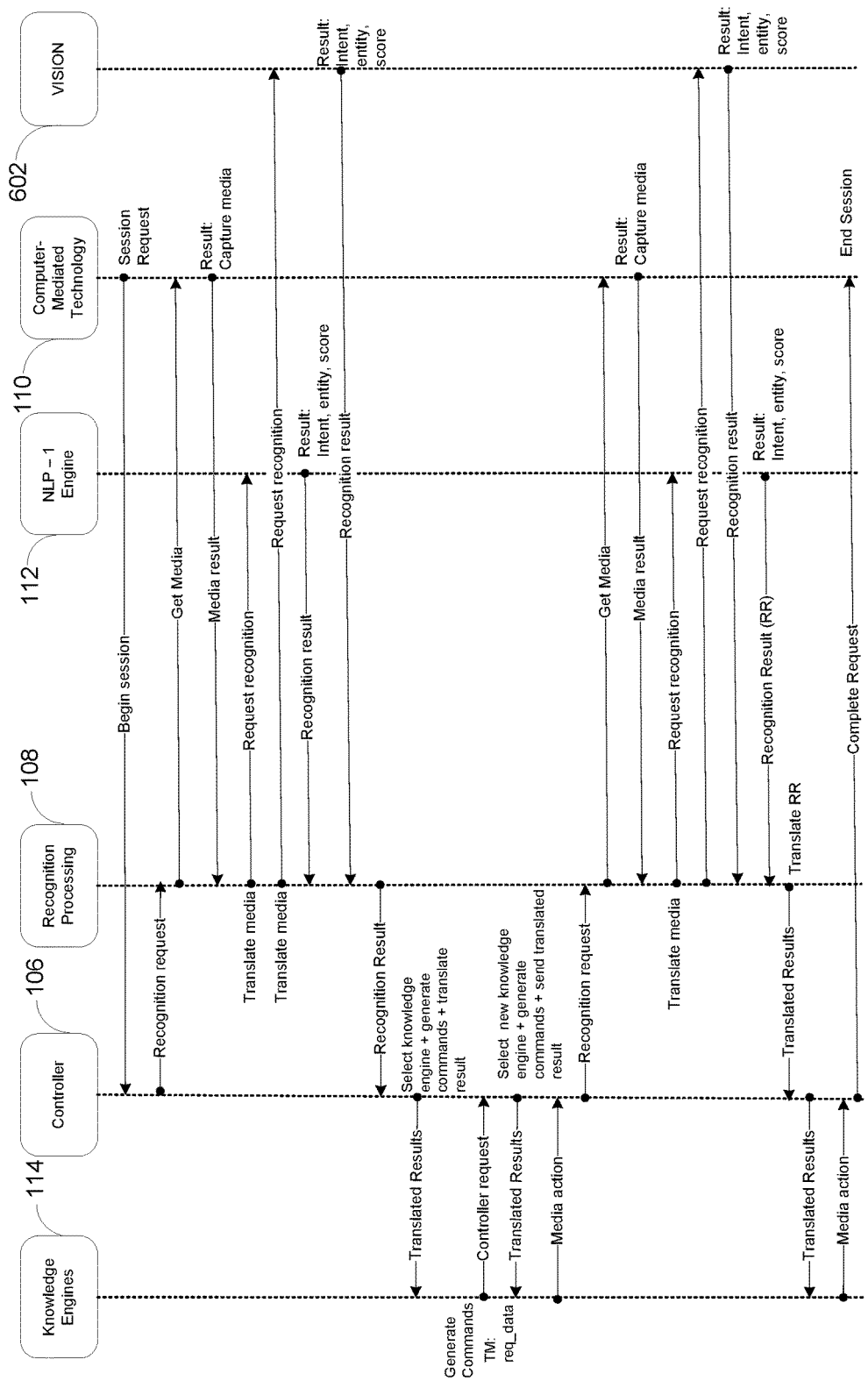
FIG. 7 a second flow diagram of a program that conducts dialogues and/or executes tasks from one or more input sources.

In FIG. 7, the controller 106 executes exchange management. The controller 106 selects a second knowledge engine 114 in response to a request from the first selected knowledge engine 114. A session begins with a request from the session initiator 104. The recognition processor 108 capture the media from the computer-mediated social technology 110 and converts the captured media into a system-specific format processed by the natural language processor engine 112 and/or computer vision engine 602. The natural language processing engine results include representations of the captured media (i.e., interpretations), process commands, intents and related sub-entities extracted from the media, confidence scores of the intents and/or sub-entity combinations, etc. The computer vision results may include physical object identification information, physical object position and orientation information, numerical measurement data, counts and classification of physical objects, images of the physical objects, and confidence values related to the physical object identification.

Controller 106 translates the results into the system-specific formats of the selected knowledge engine 114 or passes them through. Knowledge engine 114 selections are based on intents, physical object data/information, and selections of the highest associated confidence score or combinations of intents and sub-entities and the highest associated confidence scores. In FIG. 7 the results are passed through or translated into a predefined form, format, and/or protocol usable by the first selected knowledge engine 114 and process commands are generated that are passed to the first selected knowledge engine 114.

Based on a knowledge base associated with the selected knowledge engine 114, the selected knowledge engine 114 may request that the process commands and result be shared with another knowledge engine 114. The selected knowledge engine's request triggers the selection of one or more other knowledge engines by controller 106. The controller 106 may pass the results through or convert the results to a second form, format, and/or protocol if different from the first form or translation. If the first and/or second selected knowledge engine 114 responds with a request for more information as shown in FIG. 7, one or more recognition and/or image capture cycle occurs (one more recognition and capture cycle is shown). The second recognition cycle captures the requested textual, auditory, and/or images or video information from the computer-mediated social technology 110.

The recognition processor 108 captures the textual, auditory, and/or images or video. The recognition processor 108 passes through or converts the captured results into a system-specific format that is processed by the natural language processor engine 112 and/or computer vision engine 602. The results are passed through or translated into the one or more forms, formats, and/or protocols of the first and/or second knowledge engines. The passed through or translated results are then transmitted to the selected first and/or second knowledge engines 114. The knowledge engines 114 complete the action or transaction, confirm the completed request, and the controller 106 terminates the session.

Figure 8:
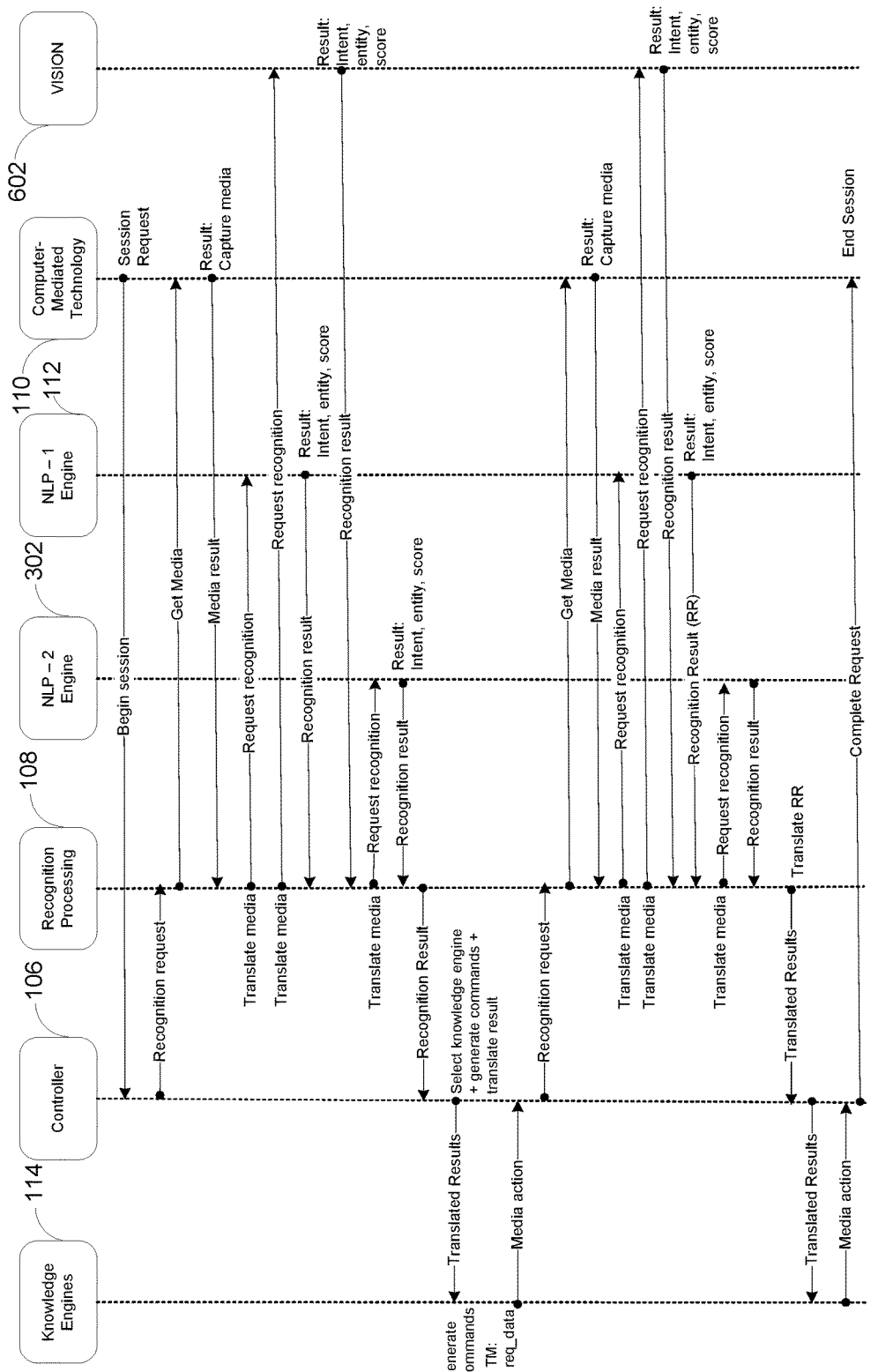
FIG. 8 a third flow diagram of a program that conducts dialogues and/or executes tasks from one or more input sources.

In FIG. 8, two recognition cycles are executed using two separate and remote natural language processing engines 112 and 302. The celestial based architecture interfaces local and remote natural language processing engines including cloud-based natural language recognizers and/or local natural language recognizers having the centralized (e.g., localized) or distributed architectures described above. Social media 110 triggers the first recognition cycle by sending a request to the session initiator 104, which requests a session and a recognition cycle from controller 106. The recognition processor 108 captures media from the computer-mediated social technology 110 and passes it through or converts it into a system-specific format processed by the natural language processor engine 112 and/or computer vision engine 602. The natural language processing engine results include representations of the captured media (i.e., interpretations), process commands, intents and related sub-entities based on or extracted from the media, confidence scores of the intents or intent sub-entity combinations, etc. The computer vision results may include physical object identification information, physical object position and orientation information, numerical measurement data, counts and classification of physical objects, images of the physical objects, and confidence values related to the physical object identification.

When the results are returned, recognition processor 108 determines if additional recognition is needed via a second recognizer such as the second natural language processing engine 302 shown in FIG. 8. When additional recognition is needed, the recognition processor 108 passes through or converts the captured media into the system-specific format that is processed by the second natural language engine 302. The results generally include representations of the captured media (i.e., interpretations), process commands, intents and related sub-entities based on or extracted from the media, confidence scores of the intents and/or intents and sub-entity combinations, etc. The natural language processing engines 112 and 302 results and computer vision results are returned to controller 106, which then passes them through or translates them into the system-specific formats of the selected knowledge engine 114. One or more knowledge engines may be selected based on a combination of intents and sub-entities and associated confidence scores and computer vision results. In some dialogues, a knowledge engine 114 responds with a request for more information as shown in FIG. 8. The request may include commands to execute a one or more recognition cycles (one more is shown) by one or both of the natural language processing engines 112 and 302 and the computer vision 602. The request results in capturing additional textual, auditory, images, and/or video.

The recognition processor 108 passes through or converts the captured media into a system-specific format that is processed by one or both of the natural language processor engines 112 and/or 302 and/or computer vision system. The results are translated into the system-specific formats, which are transmitted to the selected knowledge engines 114. The knowledge engine 114 thereafter completes an action or transaction or executes another recognition cycle before it confirms the completed request via social media 110. Once confirmed, the controller 106 terminates the session.

Figure 9:
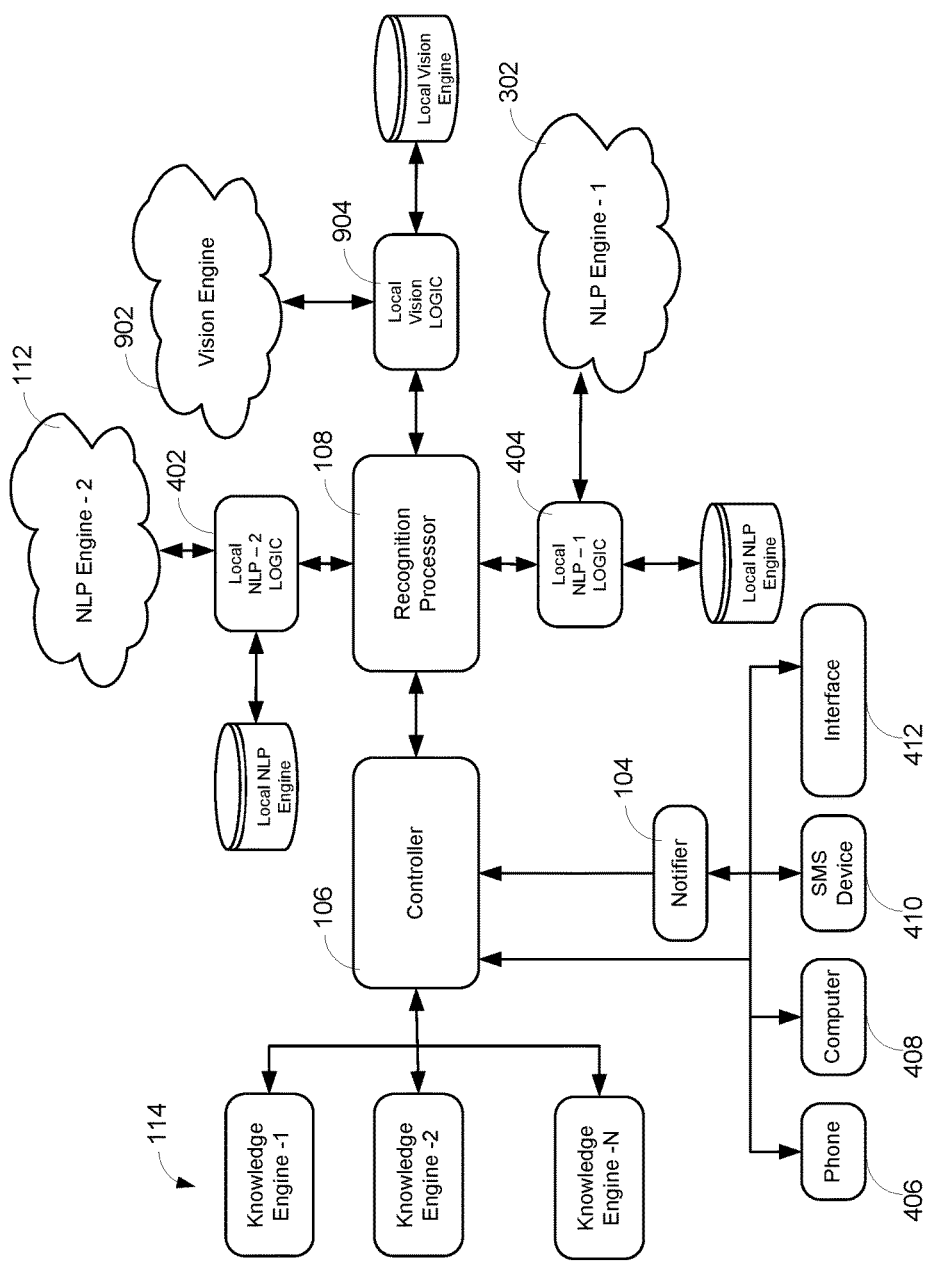
FIG. 9 is a block diagram of an intelligent conversational system with computer vision.

FIG. 9 is a block diagram of the interactive agent that may execute the process flows described above and those shown in FIGS. 6-8 automatically. In FIG. 9, the recognition processor 108 interfaces two natural language processing engines 112 and 302 through abstraction level logic 402 and 404 and a computer vision engine 902 through abstraction level logic 904. The natural language processing engines 112 and 302 may be local and/or cloud-based (e.g., remote). A natural language platform collects social media input, passes the dialogue to one or more of the natural language processing engines 112 and 302 and/or computer vision engines 902, and passes the recognition results to controller 106. The recognition results are assigned confidence scores or ratings that reflect the likelihood of an accurate recognition by one or more natural language processing engines and/or computer vision engines. The natural language processing engines 112 and 302 and computer vision engine 902 are separate from the knowledge engines 114 (1 though N shown) that process the recognition results. Each knowledge engines 114 process specific types of recognized results. In some insurance systems, one knowledge engine handles insurance quoting, a second knowledge engine handles claims processing, a third knowledge engine handles insurance servicing of existing insurance policies, a fourth knowledge engine handles usage-based insurance, and/or a sixth knowledge engine handles other functions.

In FIG. 9, the interactive agent includes a session indicator 104 that initiates sessions and confirms their terminations. The session indicator 104 and controller 106 interfaces phones 406, computers 408, short-message-service devices 410, and other interfaces that provide interactions with other devices such as vehicles and/or smart homes.

Figure 10:
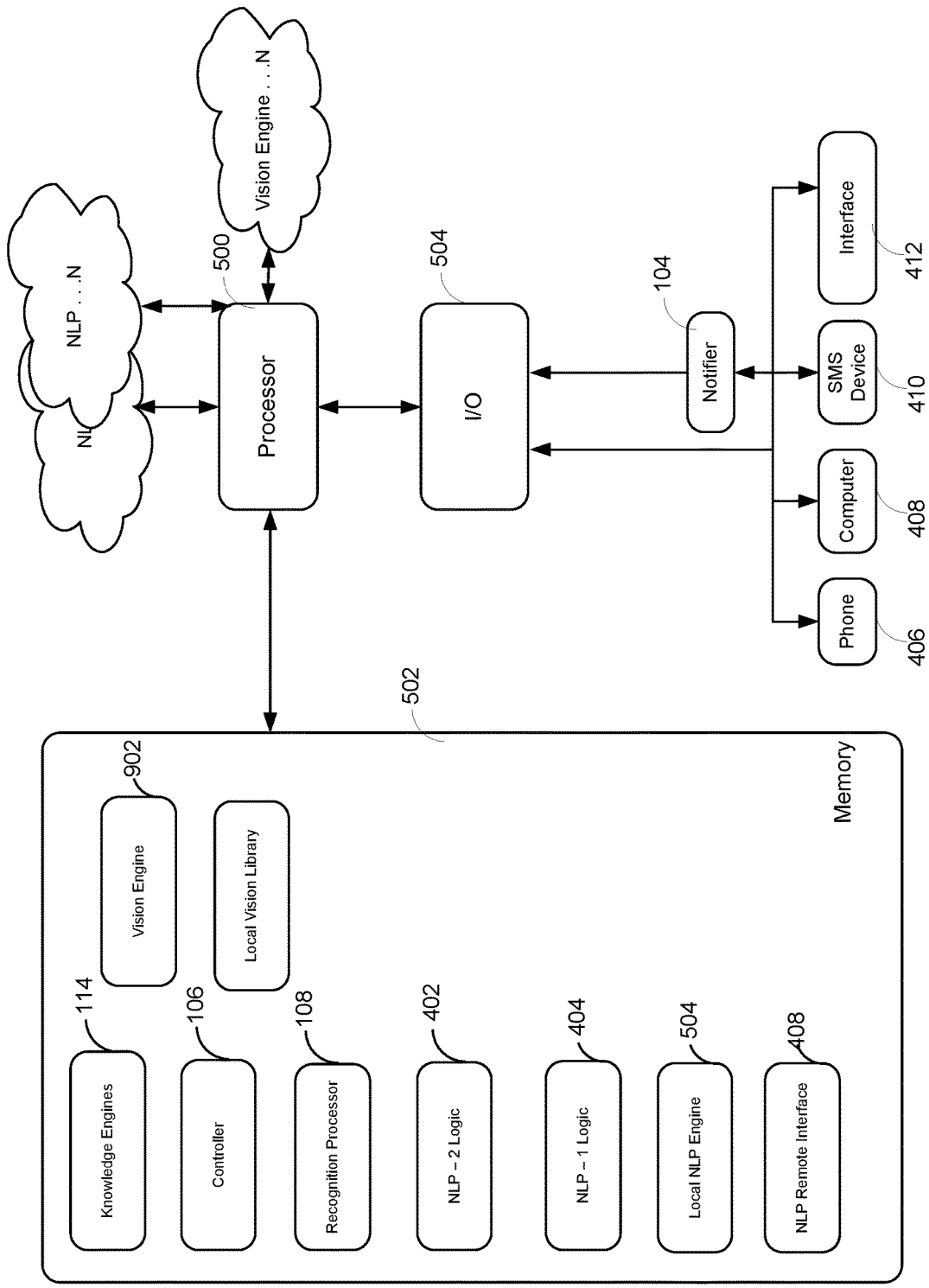
FIG. 10 is an alternate block diagram of an intelligent conversational system with computer vision.

FIG. 10 is a block diagram of an interactive agent that may execute the process flows described above and those shown in FIGS. 6-8 automatically. The system comprises a processor 500, a non-transitory media such as a memory 502 (the contents of which are accessible by the processor 500), a session initiator 104, and an I/O interface 504. The I/O interface 504 connects devices and local and/or remote applications such as, for example, additional local and/or remote recognition and/or computer vision modules and local and/or remote knowledge engines. The memory 502 stores instructions which when executed by the processor 500 causes the interactive agent to render some or all of the functionality associated with interpreting dialogue and executing an appropriate action. The memory 502 stores instructions, which when executed by the processor 500, causes the interactive agent to render the functionality associated with the knowledge engines 114, controller 106, recognition processor 108, abstraction level logic 402, 404, and 904 the local natural language processing engine 504, the local computer vision engine (cloud-based computer vision engine is also shown), and/or the software that interface the remote natural language processing engine and vision library shown as cloud.

The memory 502 and/or storage disclosed may retain an ordered listing of executable instructions for implementing the functions described above in a non-transitory computer code. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memory 502 may comprise a single device or multiple devices that may be disposed on one or more dedicated memory devices or disposed on a processor or other similar device. The engines may comprise a processor or a portion of a program that executes or supports recognition system or processes. When functions, steps, etc. are said to be "responsive to" or occur "in response to" another function or step, etc., the functions or steps necessarily occur as a result of another function or step, etc. It is not sufficient that a function or act merely follow or occur subsequent to another. Further, the term "social media" generally refers to computer-mediated technology that enables users to share content with another entity or device or participate in social networking that may occur via virtual communities and networks. Computer-mediated technology enables human communication that occurs through two or more electronic devices. The devices may provide input from various sources including, but not limited to, audio, text, images, video, augmented reality, etc.

While each of the systems and methods shown and described herein operate automatically and operate independently, they also may be encompassed within other systems and methods including any number (N) of iterations of some or all of the process used to recognize input, render recognized results, and/or render an output. Alternate interactive systems may include any combinations of structure and functions described or shown in one or more of the FIGS. These automated interactive systems are formed from any combination of structures and functions described. The structures and functions may process additional or different input. For example, each of the interactive agents may include a knowledge base and further each interactive agent described may process speech (e.g., spoken utterances). Interactive agents that process speech include automatic speech recognition engines and/or platforms that serve social media 110 or speech applications. A speech application, which is often run independently and remote from a speech platform and speech engine, interacts with a user like social media 110. The speech application or social media 110 provides input to the speech platform that passes spoken utterances to a speech engine. The speech engine converts the spoken utterance to a representation, compares the representation of the spoken utterance to a vocabulary, and matches the representation to a vocabulary of words. The speech engine returns its interpretation of the spoken utterance, process commands, intents and related sub-entities, confidence scores of the intents and in some instances confidence scores of the related sub-entities, etc., as a recognition result. The recognition result is passed back to the recognition processor 108, the controller 106, and/or one or more knowledge engines 114 to execute the functions described in each of the embodiments and shown in each of the FIGS. separately or in combination.

The functions, acts or tasks illustrated in the FIGS. or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination.

The disclosed interactive agent converses in an easy and familiar manner. It converses lightly and casually using an end user's style and vocabulary, in a fashion and a tone that is similar to, or indistinguishable from, that of human speech. The interactive agent moves beyond traditional desktop and mobile processing and is accessible via an application program interface within a celestial architecture.

Each of the disclosed modules are not limited to one protocol or framework. The modular framework, data conversion (e.g., the ability to encode data a variety of different ways so that it can be seamlessly processed by different computers, operating systems, or programs), etc. allow the interactive agents to interface open source and/or private systems including legacy systems without recoding software to different languages, formats, and domains. Specific functionality may be added without updating the entire system (improving scalability), functionality may be isolated (e.g., separating running programs to mitigate system failures or software vulnerabilities from spreading to other software), and/or functionality may be removed through its use and management of modules and the translation of the data sourced to them via controller 106. The framework further enhances security (organizations can update selected software instead of waiting for holistic updates) and enhances productivity (when bottlenecks occur, additional modules may be added and plugged-in). The framework reduces the computational burden placed on other components and improves the functioning of the computer itself.

The subject-matter of the disclosure may also relate, among others, to the following aspects (referenced by numbers):

1. A system that simulates conversation with a human user, comprising:
    a recognition processor that receives media and converts the media into a system-specific format;
    a first natural language processing engine that compares the converted media to a vocabulary and generates a plurality of intents and a plurality of sub-entities; and
    a controller that transforms the plurality of intents and sub-entities into a pre-defined format and routes the plurality of intents and the plurality of sub-entities to a first selected knowledge engine and a second knowledge engine;
    where the first selected knowledge engine selects the second knowledge engine and each active grammar in the vocabulary uniquely identifies each of the plurality of knowledge engines.
2. The system of aspect 1 further comprising a knowledge base accessible to the plurality of knowledge engines that includes a plurality of attributes that identify a user's intention.
3. The system of aspect 2 where the knowledge base comprises a plurality of downloadable profiles.
4. The system of any of aspects 1 to 3 where the active grammars comprise a plurality of words and phrases to be recognized.
5. The system of any of aspects 1 to 4 where the plurality of knowledge engines comprise an insurance quoting knowledge engine, a claims processing knowledge engine, and an on-line insurance servicing knowledge engine.
6. The system of any of aspects 1 to 5 further comprising an exchange manager in communication with the controller that identifies the user's generation.
7. The system of aspect 6 where the exchange manager identifies a plurality of words or a phrase associated with the identified user's generation and renders the words or phrase on social media in response to the received media.
8 The system of any of aspects 1 to 7 further comprising a second natural language processing engine that compares a second converted media to the vocabulary and generates a second plurality of intents and a second plurality of sub-entities.
9. The system of aspect 8 where the first and the second natural processing engine comprises an automatic speech recognition service.
10. The system of any of aspects 1 to 9 further comprising a vision engine that transmits the location and identification of a physical object to the controller.
11. A method that simulates conversation with a human user, comprising:
    receiving media and converting the media into a system-specific format;
    comparing the converted media to a vocabulary and generating a plurality of intents and a plurality of sub-entities; and
    transforming the plurality of intents and sub-entities into a pre-defined format and routing the plurality of intents and the plurality of sub-entities to a first selected knowledge engine and a second knowledge engine;
    where the first selected knowledge engine selects the second knowledge engine and each active grammar in the vocabulary uniquely identifies each of the plurality of knowledge engines.
12. The method of aspect 11 further comprising accessing a plurality of attributes that identify a user's intention.
13. The method of aspect 12 where the plurality of attributes are stored in a plurality of downloadable profiles.
14. The method of any of aspects 11 to 13 where the active grammars comprise a plurality of words and phrases to be recognized.
15. The method of any of aspects 11 to 14 where the plurality of knowledge engines comprise an insurance quoting knowledge engine, a claims processing knowledge engine, and an on-line insurance servicing knowledge engine.
16. The method of any of aspects 11 to 15 further comprising an exchange manager in communication with the controller that identifies the user's generation.
17. The method of aspect 16 where the exchange manager identifies a plurality of words or a phrase associated with the identified user's generation and renders the words and phrases on social media in response to the received media.
18. The method of any of aspects 11 to 17 further comprising comparing a second converted media to the vocabulary and generating a second plurality of intents and a second plurality of sub-entities.
19. The method of aspect 18 where the first and second plurality of intents and the first and second plurality of sub-entities identify speech.
20. The method of any of aspects 11 to 19 further comprising a vision engine that transmits the locations and identifications of a physical object to the controller.
21. A non-transitory machine-readable medium encoded with machine-executable instructions, where execution of the machine-executable instructions is for:
    receiving media and converting the media into a system-specific format;
    comparing the converted media to a vocabulary and generating a plurality of intents and a plurality of sub-entities; and
    transforming the plurality of intents and sub-entities into a pre-defined format and routing the plurality of intents and the plurality of sub-entities to a first selected knowledge engine and a second knowledge engine;
    where the first selected knowledge engine selects the second knowledge engine and each active grammar of the vocabulary uniquely identifies each of the plurality of knowledge engines.

22. The non-transitory machine-readable medium of aspect 21 further comprising accessing a plurality of attributes that identify a user's intention.

23. The non-transitory machine-readable medium of aspect 22 where the plurality of attributes are stored in a plurality of downloadable profiles.

24. The non-transitory machine-readable medium of any of aspects 21 to 23 where the active grammars comprise a plurality of words and phrases to be recognized.

25. The non-transitory machine-readable medium of any of aspects 21 to 23 where the plurality of knowledge engines comprise an insurance quoting knowledge engine, a claims processing knowledge engine, and an on-line insurance servicing knowledge engine.

26. The non-transitory machine-readable medium of any of aspects 21 to 25 further comprising an exchange manager in communication with the controller that identifies the user's generation.

27. The non-transitory machine-readable medium of aspect 26 where the exchange manager identifies a plurality of words or a phrase associated with the identified user's generation and renderers them on social media in response to the received media.

28. The non-transitory machine-readable medium of any of aspects 21 to 27 further comprising comparing a second converted media to the vocabulary and generating a second plurality of intents and a second plurality of sub-entities.

29. The non-transitory machine-readable medium of aspect 28 where the first and second plurality of intents and the first and second plurality of sub-entities identify speech.

30. The non-transitory machine-readable medium of any of aspects 21 to 29 further comprising a vision engine that transmits the locations and identifications of a physical object to the controller.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A system that simulates conversation with a human user, comprising:
   a recognition processor that receives media and converts the media into a system-specific format;
   a first natural language processing engine that compares the converted media to a vocabulary and generates a plurality of intents and a plurality of sub-entities; and
   a controller that transforms the plurality of intents and the plurality of sub-entities into a pre-defined format and routes the plurality of intents and the plurality of sub-entities to a first selected knowledge engine and a second knowledge engine;
   where the first selected knowledge engine selects the second knowledge engine based on a knowledge base and a downloadable profile; and
   where each active grammar in the vocabulary uniquely identifies each of the plurality of knowledge engines.

2. The system of claim 1 further comprising a knowledge base accessible to the first selected knowledge engine and the second knowledge engine that includes a plurality of attributes that identify a user's intention.

3. The system of claim 2 where the knowledge base comprises a plurality of downloadable profiles.

4. The system of claim 1 where the active grammars comprise a plurality of words and phrases to be recognized.

5. The system of claim 1 where the first selected knowledge engine and the second knowledge engine comprise an insurance quoting knowledge engine, a claims processing knowledge engine, or an on-line insurance servicing knowledge engine.

6. The system of claim 1 further comprising a second natural language processing engine that compares a second converted media to the vocabulary and generates a second plurality of intents and a second plurality of sub-entities.

7. The system of claim 6 where the first and the second natural processing engines comprise an automatic speech recognition service.

8. A method that simulates conversation with a human user, comprising:
   receiving media and converting the media into a system-specific format;
   comparing the converted media to a vocabulary and generating a plurality of intents and a plurality of sub-entities; and
   transforming the plurality of intents and the plurality of sub-entities into a pre-defined format and routing the plurality of intents and the plurality of sub-entities to a first selected knowledge engine and a second knowledge engine;
   where the first selected knowledge engine selects the second knowledge engine based on a knowledge base and a downloadable profile; and
   where each active grammar in the vocabulary uniquely identifies each of the plurality of knowledge engines.

9. The method of claim 8 further comprising accessing a plurality of attributes that identify a user's intention.

10. The method of claim 9 where the plurality of attributes are stored in a plurality of downloadable profiles.

11. The method of claim 8 where the active grammars comprise a plurality of words and phrases to be recognized.

12. The method of claim 8 where the first selected knowledge engine and the second knowledge engine comprise an insurance quoting knowledge engine, a claims processing knowledge engine, and an on-line insurance servicing knowledge engine.

13. The method of claim 8 where an exchange manager identifies a plurality of words or a phrase associated with the identified user's generation and renders the plurality of words or the phrase on a social media device in response to the received media.

14. The method of claim 8 further comprising comparing a second converted media to the vocabulary and generating a second plurality of intents and a second plurality of sub-entities.

15. The method of claim 14 where the first and the second plurality of intents and the first and the second plurality of sub-entities identify speech.

16. A non-transitory machine-readable medium encoded with machine-executable instructions, where execution of the machine-executable instructions is for:
   receiving media and converting the media into a system-specific format;
   comparing the converted media to a vocabulary and generating a plurality of intents and a plurality of sub-entities; and
   transforming the plurality of intents and sub-entities into a pre-defined format and routing the plurality of intents and the plurality of sub-entities to a first selected knowledge engine and a second knowledge engine;
   where the first selected knowledge engine selects the second knowledge engine based on a knowledge base and a downloadable profile; and where each active grammar of the vocabulary uniquely identifies each of the plurality of knowledge engines.

17. The non-transitory machine-readable medium of claim 16 further comprising accessing a plurality of attributes that identify a user's intention.

18. The non-transitory machine-readable medium of claim 17 where the plurality of attributes are stored in a plurality of downloadable profiles.

19. The non-transitory machine-readable medium of claim 16 where the active grammars comprise a plurality of words and phrases to be recognized.

20. The non-transitory machine-readable medium of claim 16 where the first selected knowledge engine and the second knowledge engine comprise an insurance quoting knowledge engine, a claims processing knowledge engine, or an on-line insurance servicing knowledge engine.

21. The non-transitory machine-readable medium of claim 16 further comprising comparing a second converted media to the vocabulary and generating a second plurality of intents and a second plurality of sub-entities.

22. The non-transitory machine-readable medium of claim 21 where the first and second plurality of intents and the first and second plurality of sub-entities identify speech.

23. A non-transitory machine-readable medium encoded with machine-executable instructions, where execution of the machine-executable instructions is for:
receiving media and converting the media into a system-specific format;
comparing the converted media to a vocabulary and generating a plurality of intents and a plurality of sub-entities; and
transforming the plurality of intents and the plurality of sub-entities into a pre-defined format and routing the plurality of intents and the plurality of sub-entities via a controller to a first selected knowledge engine and a second knowledge engine; and
identifying a user's generation through an exchange engine in communication with the controller;
where the first selected knowledge engine selects the second knowledge engine and each active grammar of the vocabulary uniquely identifies each of the plurality of knowledge engines.

24. The non-transitory machine-readable medium of claim 23 further comprising accessing a plurality of attributes that identify a user's intention.

25. The non-transitory machine-readable medium of claim 24 where the plurality of attributes are stored in a plurality of downloadable profiles.

26. The non-transitory machine-readable medium of claim 23 where the active grammars comprise a plurality of words or phrases to be recognized.

27. The non-transitory machine-readable medium of claim 23 where the first selected knowledge engine and the second knowledge engines comprise at least two separate engines selected from a group comprising: an insurance quoting knowledge engine, a claims processing knowledge engine, or an on-line insurance servicing knowledge engine.

28. The non-transitory machine-readable medium of claim 23 where the exchange manager identifies a plurality of words or a phrase associated with the identified user's generation and renderers the plurality of words or phrases on a social media device in response to the received media.

29. The non-transitory machine-readable medium of claim 23 further comprising comparing a second converted media to the vocabulary and generating a second plurality of intents and a second plurality of sub-entities.

30. The non-transitory machine-readable medium of claim 29 where the first and the second plurality of intents and the first and the second plurality of sub-entities identify speech.

31. A non-transitory machine-readable medium encoded with machine-executable instructions, where execution of the machine-executable instructions is for:
receiving media and converting the media into a system-specific format;
comparing the converted media to a vocabulary and generating a plurality of intents and a plurality of sub-entities; and
transforming the plurality of intents and the plurality of sub-entities into a pre-defined format and routing the plurality of intents and the plurality of sub-entities via a controller to a first selected knowledge engine and a second knowledge engine; and
transmitting a location and an identification of a physical object via a vision engine to the controller;
where the first selected knowledge engine selects the second knowledge engine and each active grammar of the vocabulary uniquely identifies each of the plurality of knowledge engines.

32. A system that simulates conversation with a human user, comprising:
a recognition processor that receives media and converts the media into a system-specific format;
a first natural language processing engine that compares the converted media to a vocabulary and generates a plurality of intents and a plurality of sub-entities; and
a controller that transforms the plurality of intents and the plurality of sub-entities into a pre-defined format and routes the plurality of intents and the plurality of sub-entities to a first selected knowledge engine and a second knowledge engine; and
means that identifies the human user's generation;
where the first selected knowledge engine selects the second knowledge engine and each active grammar in the vocabulary uniquely identifies each of the plurality of knowledge engines.

33. A system that simulates conversation with a human user, comprising:
a recognition processor that receives media and converts the media into a system-specific format;
a first natural language processing engine that compares the converted media to a vocabulary and generates a plurality of intents and a plurality of sub-entities; and
a controller that transforms the plurality of intents and the plurality of sub-entities into a pre-defined format and routes the plurality of intents and the plurality of sub-entities to a first selected knowledge engine and a second knowledge engine; and
means that transmits a location and an identification of a physical object to the controller;
where the first selected knowledge engine selects the second knowledge engine and each active grammar in the vocabulary uniquely identifies each of the plurality of knowledge engines.

* * * * *